United States Patent [19]
Hashimoto et al.

[11] Patent Number: 4,819,311
[45] Date of Patent: Apr. 11, 1989

[54] MACHINE TOOL

[75] Inventors: Hitoshi Hashimoto; Tsutomu Fujita; Eiji Ryukawa; Hideo Kodachi, all of Sayama, Japan

[73] Assignee: Honda Giken Kogyo Kabushiki Kaisha, Tokyo, Japan

[21] Appl. No.: 62,506

[22] Filed: Jun. 15, 1987

[30] Foreign Application Priority Data

Dec. 26, 1986 [JP] Japan ................. 61-310856

[51] Int. Cl.$^4$ .............................................. B33C 1/00
[52] U.S. Cl. ...................................... 29/40; 29/48.5 A; 408/35; 409/201; 409/211; 409/231
[58] Field of Search ............... 29/26 A, 35.5, 39, 40, 29/568, 48.5 R, 48.5 A, 50, 52, 53; 408/35; 409/201, 203, 204, 211, 230, 231, 232, 233, 217, 235, 238, 239

[56] References Cited

U.S. PATENT DOCUMENTS 3,490,333 1/1970 Scruton ........................... 409/233
4,378,621 4/1983 Babel ................................. 29/39
4,610,584 9/1986 Malzhorn et al. ............... 409/201

FOREIGN PATENT DOCUMENTS

| 379617 | 3/1940 | Italy | 29/40 |
| 10410 | 1/1983 | Japan | 408/35 |
| 48227 | 3/1985 | Japan | 29/40 |
| 2120965 | 12/1983 | United Kingdom | 29/35.5 |

Primary Examiner—Gil Weidenfeld
Assistant Examiner—Daniel W. Howell
Attorney, Agent, or Firm—Roberts, Spiecens & Cohen

[57] ABSTRACT

A machine tool comprises an upstanding column, a tool-driving unit vertically movable on the column, and a pair of guide rails on a front surface of the column to extend vertically thereon and horizontally spaced apart from each other for guiding the upward and downward movement of the tool-driving unit. The tool-driving unit includes a lift frame on the guide rails and a tilting-type turret head which is supported on a front surface of the lift frame and is rotatable about an axis inclined relative to the longitudinal direction of the frame in a horizontal plane. One of the pair of guide rails is relatively disposed forwardly of the other guide rail, so that the individual guide rails both assume positions close to the turret head thereby to minimize the amount of overhang of the tool-driving unit.

9 Claims, 14 Drawing Sheets

MACHINE TOOL

BACKGROUND OF THE INVENTION

1. Field of the Invention

The present invention relates to a machine tool, and particularly to, a machine tool comprising a tool-driving unit which is liftable relative to a support column and which includes a lift frame movable up and down along a pair of left and right guide rails on a front surface of the column to extend vertically thereon, and a tilting-type turret head supported on a front surface of the lift frame for rotation about an axis inclined with respect to the front and rear direction of the frame in a horizontal plane.

2. Description of the Prior Art

A machine tool with a tool-replacing turret is known from Japanese patent publication No. 32112/72 and Japanese patent application laid-open No. 122976/77. There is also known a machine tool comprising a supporting device for a tool-driving unit liftable relative to a support column, such as shown in FIG. 15, the tool-driving unit including a lift frame movable up and down along a pair of left and right guide rails laid on a front surface of the column to extend vertically thereon, and a tilting-type turret head supported on a front surface of the lift frame for rotation about an axis inclined with respect to the front and rear direction.

Referring to FIG. 15, the pair of left and right guide rails 291 and 292 are mounted on the front surface of the column 290 of the machine tool to extend vertically thereon, so that the lift frame 293 of the tool driving unit A' may be moved up and down along the guide rails 291 and 292 while receiving a vertically moving force from a vertical feed screw 294. The tilting-type turret head 296 rotatable about an axis extending inclined to the front and rear direction of the frame 293 on a horizontal plane is supported at a leading end of a cylindrical support 295 formed on a front portion of the lift frame 293 and has a cylindrical connection 297 whose outer periphery is rotatably supported through a bearing 298 on an inner peripheral surface of the cylindrical support 295 of the lift frame 293. An outer peripheral flange 293f at the outer end of the cylindrical support 295 and an outer peripheral flange 296f at the connection of the turret head 296 are slidable on each other and have tapered surfaces on their back surfaces. An annular clamp 299 is fitted over the outer peripheral surfaces of the outer peripheral flanges 293f and 296f for inhibiting the rotation of the turret head 296 relative to the lift frame 293 as required.

A gear 200 is integrally secured to an end face of the cylindrical connection 297 of the turret head 296 and is in mesh with a gear 205 which is driven through a bevel gear 202, a bevel gear 203 and a gear shaft 204 by a turret-rotating motor 201 disposed on the lift frame 293.

A rotational driving force from a tool-rotating motor 206 disposed on the lift frame 293 is transmitted through a coupling 207 connected to an output shaft of the tool-rotating motor 206, gears 208, 209 and 210, a spline 211 on a gear shaft of the gear 210, and a driving engage member 213 of a clutch 212 fitted on the spline 211 and operated through a bearing 214 by a clutch operating cylinder 215 to move axially, to the base end of a spindle 217 rotatably fitted to an inner peripheral surface of a spindle head 216 of the turret head 296. A tool holder 220 for holding a slice cutter 219 serving as a tool is held at a leading end of the spindle 217 for rotation in unison with the spindle 217.

The turret head 296 includes another spindle head 221 apart from the spindle head 216, and a spindle 222 having a tool holder 223 held at its fore end is rotatably fitted in the spindle head 221. The individual spindle heads 216 and 221 are formed with their central axes extending at different levels so that the corresponding spindles cannot interfere with each other. During working, the spindle head is in the position 216 shown in solid lines in the drawing and aligned with the spline 211, and in replacing the tool, the turret head 296 is rotated so that the spindle head assumes the position 221 shown by dashed lines.

In the prior art machine tool shown in FIG. 15, the pair of guide rails 291 and 292 constituting a supporting device for the tool-driving unit A' are both disposed on the same vertical plane extending in a lateral direction (i.e., a vertical direction as viewed in FIG. 15) and hence, as compared to the distance from one of the guide rails 291 to the connection of the turret head 296, the distance from the other guide rail 292 to the connection of the turret head 296 is very long, and the amount of overhang from the guide rail 292 on the column 290 is larger. For this reason, the tool-driving unit A' has an unsatisfactory mechanical rigidity, and this is apt to produce vibration and a reduction in horizontal accuracy of the spindle 217 due to machining load during working. In addition, the tool-driving unit A' is subject to thermal variation with respect to the guide rail 292 which adversely affects working accuracy.

SUMMARY OF THE INVENTION

It is a primary object of the present invention to provide a machine tool wherein vibration and reduction in horizontal accuracy of a spindle due to machining load can be prevented and the amount of thermal variation in a tool-driving unit may be decreased, thereby providing a further improvement in working accuracy.

According to the present invention, there is provided a machine tool comprising a tool-driving unit which is liftable relative to a support column and which includes a lift frame movable up and down along a pair of left and right guide rails mounted on a front surface of the column to extend vertically thereon, and a tilting-type turret head supported on a front surface of the lift frame for rotation about an axis inclined with respect to the fore and aft direction in a horizontal plane, wherein one of the pair of guide rails is relatively disposed ahead of the other guide rail, so that the individual guide rails both assume positions close to the turret head.

With the above construction, because one of the pair of guide rails is relatively disposed ahead of the other guide rail so that the individual guide rails both assume positions close to the turret head, the amount of overhang of the tool-driving unit from each of the guide rails is very small as compared with that in the prior art, and the tool-driving unit has an increased mechanical rigidity, so that vibration and reduction in horizontal accuracy of the spindle due to machining load during working are suppressed, while at the same time the thermal variation of the tool-driving unit are reduced, leading to improved working accuracy.

The above and other objects, features and advantages of the invention will become apparent from reading of the following description taken in conjunction with the accompanying drawings.

DESCRIPTION OF THE PREFERRED EMBODIMENT

Figure 1:
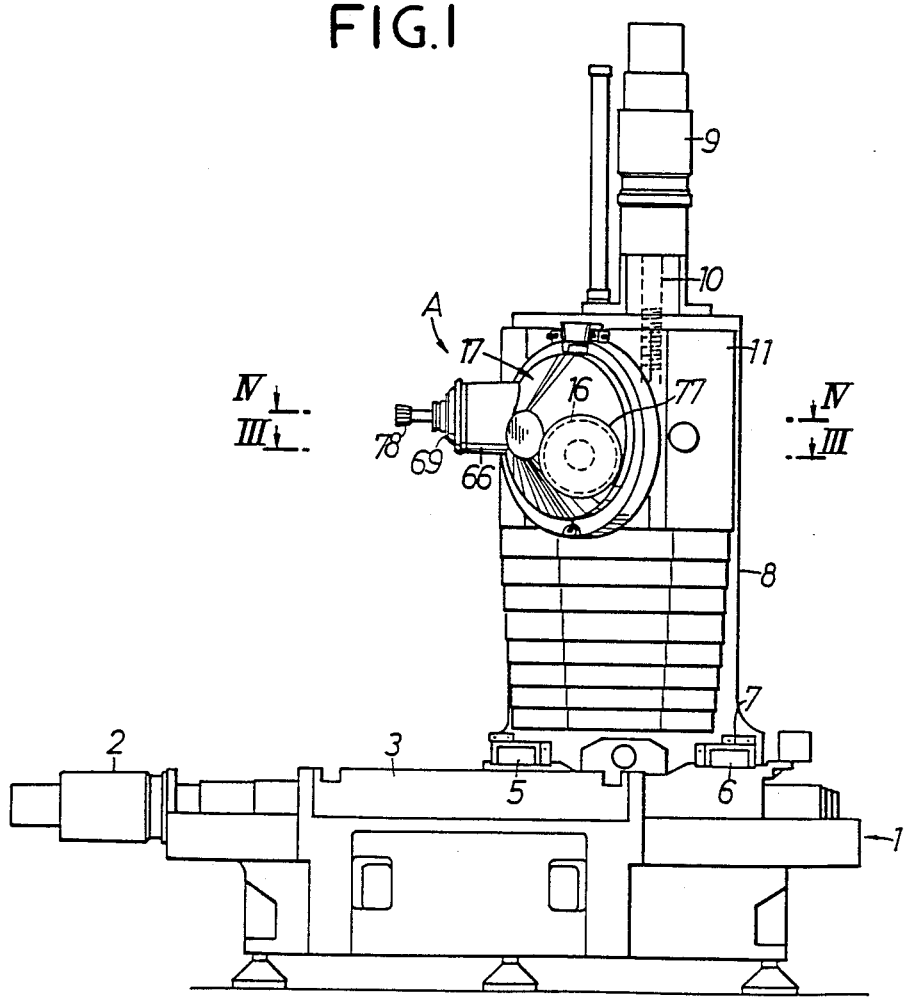
FIG. 1 is a front view illustrating one example of a machine tool with a supporting device for a tool-driving unit according to one embodiment of the present invention.
Figure 2:
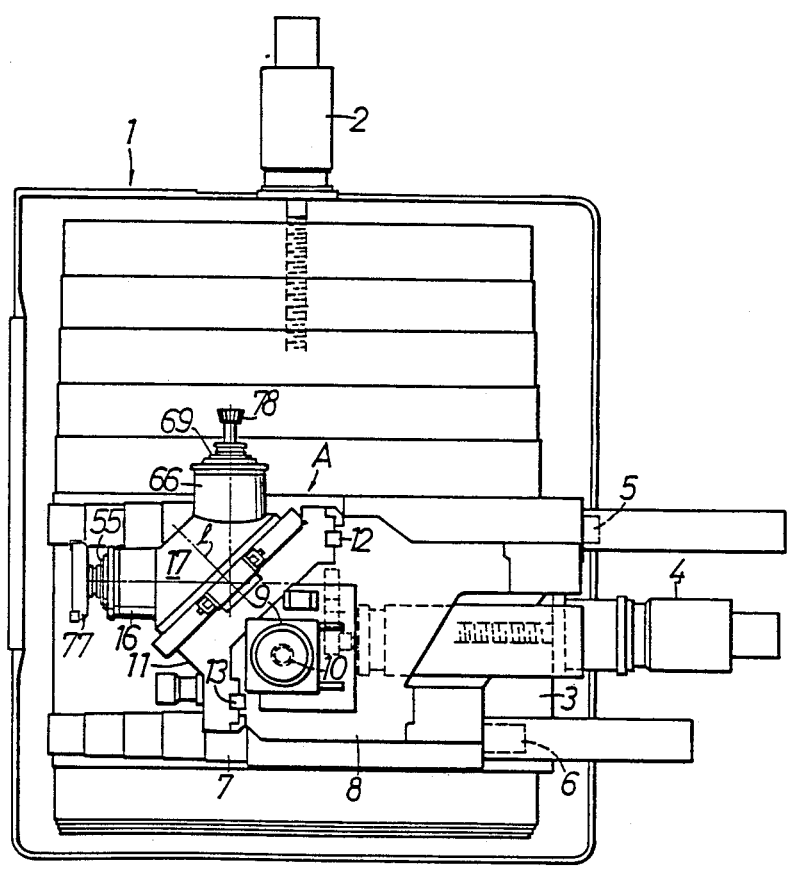
FIG. 2 is a plan view of the machine tool shown in FIG. 1.
Figure 4:
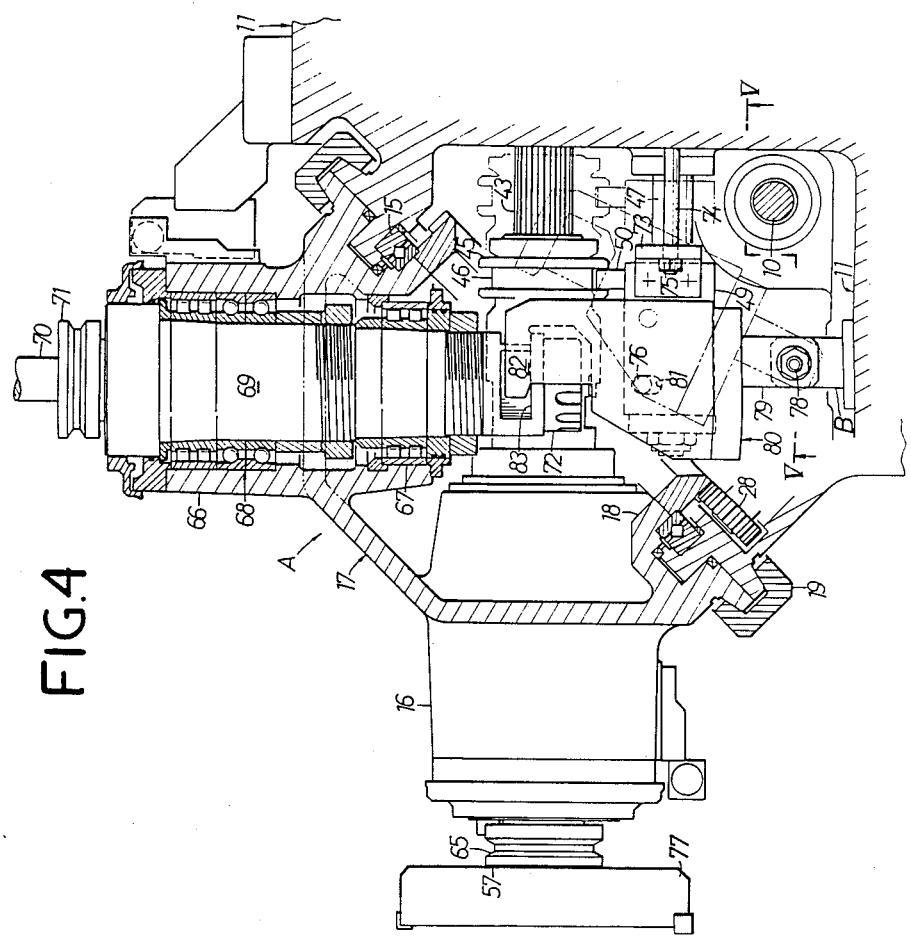
FIG. 4 is a sectional view taken along line IV—IV in FIG. 1.

One embodiment of the present invention will now be described with reference to the accompanying drawings. Referring first to FIGS. 1 and 2, a laterally movable table 3, which is movable laterally (vertically as viewed in FIG. 2) by a feed motor 2, is carried on a bed 1 of a machine tool, and a longitudinally movable rest 7, which is movable longitudinally (laterally as viewed in FIG. 2) along a pair of guide rails 5 and 6 by another feed motor 4, is carried on the laterally movable table 3. A column 8 is mounted on the movable rest 7 and a lift frame 11 of a tool drive unit A is liftable by a feed screw 10 rotatably driven by a feed motor 9 in order to be moved up and down relative to the column 8 along a pair of vertical guide rails 12 and 13 mounted on a front face (i.e., the left side as viewed in FIG. 2) of the column 8. A tilting-type turret head 17 is supported on a front surface of the lift frame 11 and is rotatable relative to the lift frame 11 about an axis 1 inclined with respect to the longitudinal direction in a horizontal plane i.e. fore and aft. A pair of spindle heads 16 and 66 are formed on the turret head 17. Respective central axes of the spindle heads 16 and 66 are in an offset relationship to each other as shown in FIG. 1 in order to avoid interference of internal mechanisms of the tool drive unit. Specifically, as shown in FIG. 4, the respective central axes of the spindle heads 16 and 66 are provided so that they may be vertically offset from each other to prevent base ends of the spindle heads from interfering with each other. In addition, these central axes are in an inclined relationship relative to the rotational axis 1 of the turret head 17. As shown in FIG. 2, during machining by the tool, the central axis of the spindle head 17 extends longitudinally of the column 8, whereas during replacement of the tool, the central axis of the spindle head 17 is directed laterally of the column 8 after rotation of the turret head 17. In FIG. 2, the spindle head 16 is in a machining position, and the spindle head 66 is in a tool-replacing position. As shown in FIG. 2, the guide rail 13 is disposed ahead of the guide rail 12 i.e. forwardly on column 8, and each of the individual guide rails 12 and 13 is spaced at a short distance from the turret head 17.

Figure 3:
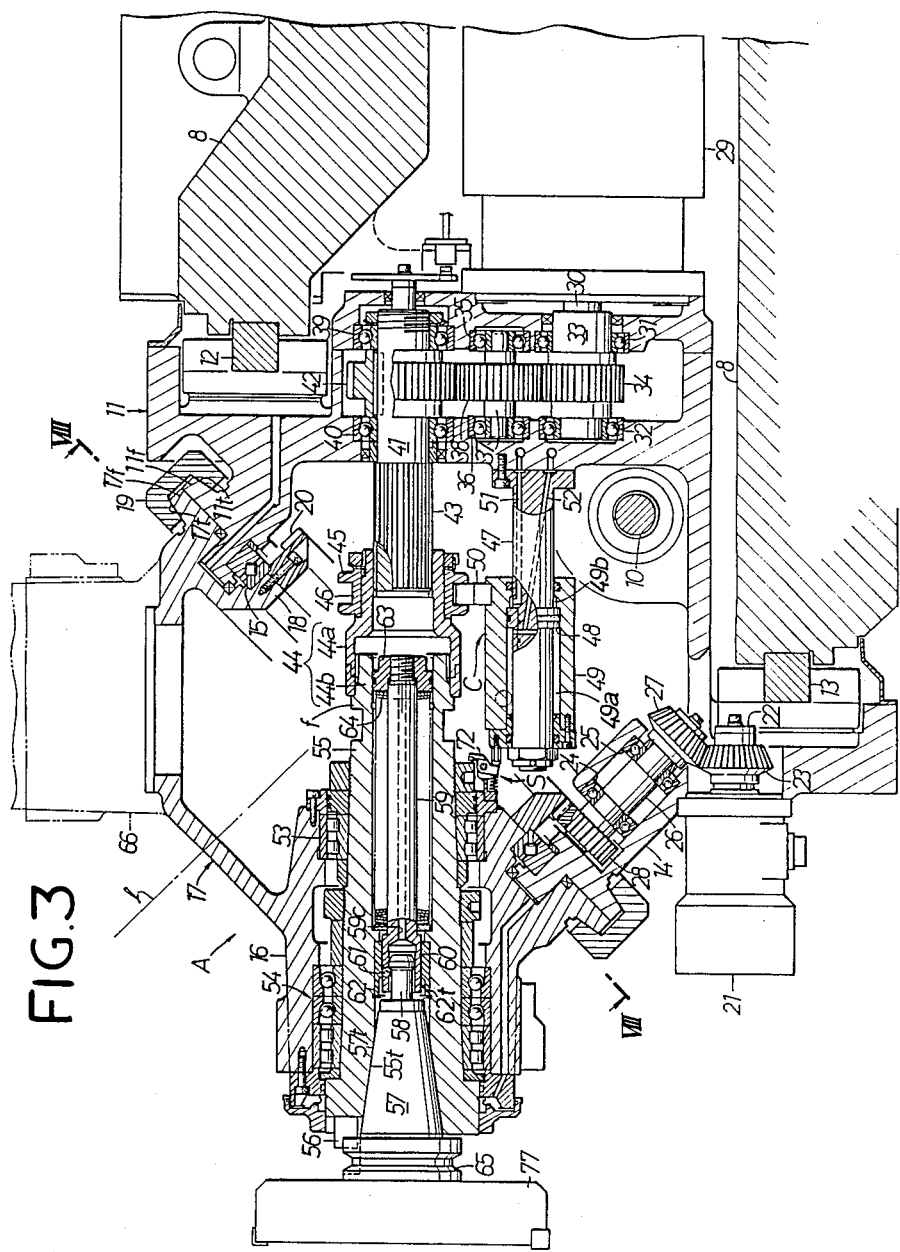
FIG. 3 is a sectional view taken along line III—III in FIG. 1.

Referring to FIG. 3, a cylindrical connection 18 of the turret head 17 is, on its outer peripheral end surface, rotatably supported through a bearing 15 on an inner peripheral surface at one end of a cylindrical support portion 14 of the lift frame 11, so that the respective opposed surfaces of an outer peripheral flange 11f of the lift frame 11 and an outer peripheral flange 17f of the turret head 17 are slidable on each other. In addition, respective back surfaces of the outer peripheral flanges 11f and 17f are provided respectively in the form of tapered surfaces 11t and 17t so as to form an annular wedge in cooperation with each other, and outer surfaces of the pair of outer peripheral flanges 11f and 17f are enclosed by an annular clamp 19 for inhibiting the rotation of the turret head 17 about the axis 1 as required.

A gear 20 is integrally secured to an end of the cylindrical connection 18 to face inwardly to the cylindrical support 14 of the lift frame 11 and meshes with a gear 28 at one of the ends of a gear shaft 26 which is journaled through bearings 24 and 25 on an inner peripheral surface of the cylindrical support 14. The gear 28 is rotatably driven by a turret-rotating motor 21 carried on the lift frame 11 through a bevel gear 23 on an output shaft of the motor 21 and a bevel gear 27 at the other end of the gear shaft 26.

A tool-rotating motor 29 is mounted on the back surface of the lift frame 11 to lie within the column 8, and a rotational driving force from the motor 29 is transmitted through an output shaft 30, a gear 34 on a gear shaft 33 rotatably supported through bearings 31 and 32 on the lift frame 11, a gear 38 on a gear shaft 37 rotatably supported through bearings 35 and 36 on the lift frame 11, and a gear 42 on a gear shaft 41 rotatably supported through bearings 39 and 40 on the lift frame 11, to a spline 43 on the outer peripheral surface of a forward projecting portion of the gear shaft 41.

Figure 11:
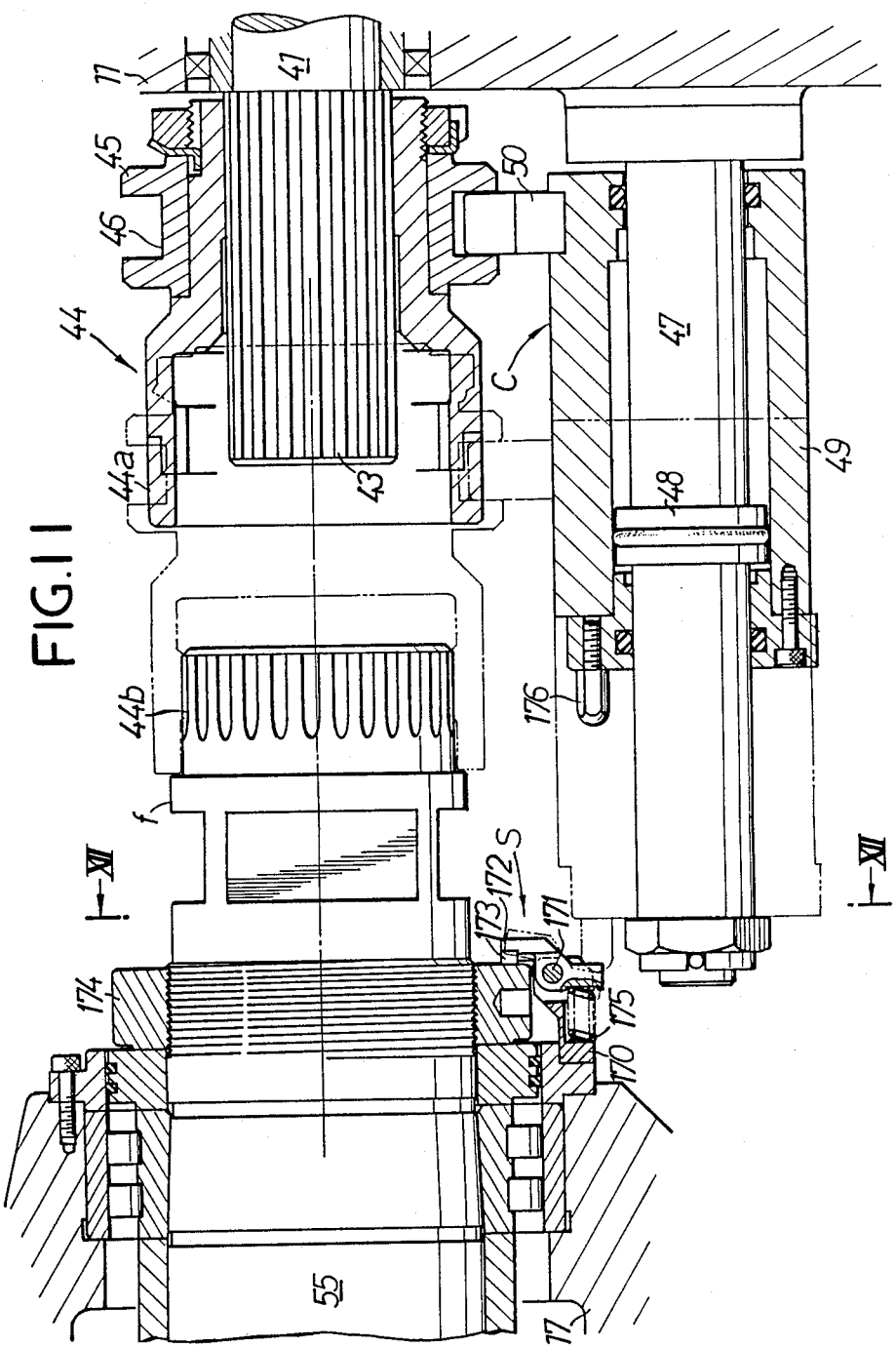
FIG. 11 is an enlarged plan view, partly in section, of a portion of the tool showing a clutch in disengagement.

A driving engage member 44a, which constitutes a clutch 44 for controlling the transmission of the rotational driving force from the motor 29 to the spindle, is axially slidably fitted, via a spline on the inner peripheral surface thereof, around the spline 43. The driving engage member 44a is generally cylindrical and has, at its front end edge, an engage portion adapted to engage a driven engage member 44b of the clutch 44. A clutch-operating ring 45 having an annular groove 46 defined in its outer peripheral surface is fixedly mounted around the outer peripheral surface of the driving engage member 44a closer to its rear end. As shown in FIG. 11, in this embodiment, the driving engage member 44a and the driven engage member 44b are releasably spline-fitted together, and in such fitted state, a front end edge of the driving engage member 44a mates with an outer peripheral flange f of the driven engage member 44b.

The driven engage member 44b is integrally connected to a rear end of a hollow spindle 55 rotatably supported on the inner periphery of the spindle head 16 through a bearing 53 and a group of bearings 54, so that when the clutch 44 is in engagement as shown in FIG. 3, the output from the tool-rotating motor 29 is transmitted through the clutch 44 to the hollow spindle 55.

Figure 5:
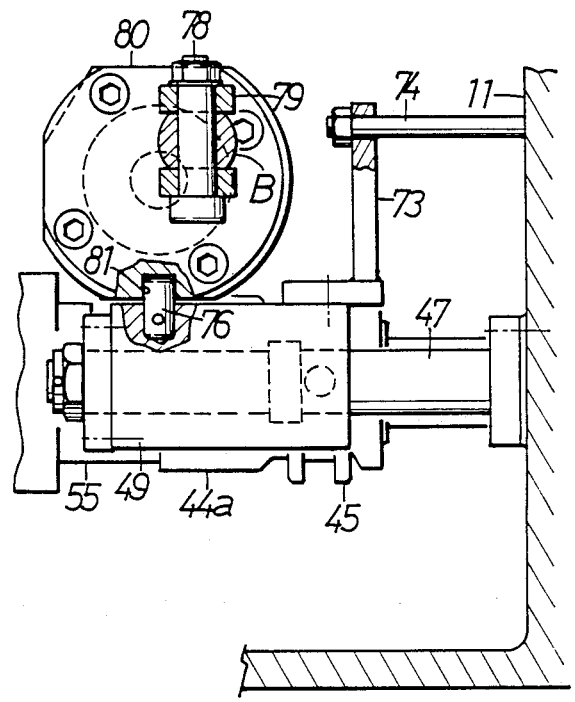
FIG. 5 is a side view taken along line V—V in FIG. 4.

A rod 47 is fixed at its base end to the lift frame 11 and projects forwardly in parallel relation to the spline 43 at a location spaced from the spline 43. The rod 47 has a stationary piston 48 formed at an axially intermediate portion thereof, and a clutch-operating cylinder 49 is fitted over the stationary piston 48. The clutch-opening cylinder 49 has axially opposite end walls adapted for sliding movement on the outer peripheral surface of the rod 47. A clutch-operating claw 50 is fixedly mounted on the outer peripheral surface of the clutch operating cylinder 49 closer to its rear end and is in engagement in the annular groove 46 in the clutch operating ring 45. As shown in FIG. 4, a slide member 73 is secured at its base end on an upper, rear end surface of the clutch-operating cylinder 49 to project in a direction perpendicular to the axial direction of the clutch-operating cylinder 49. The slide member 73 is slidably fitted over a guide rail 74 parallel to the rod 47 which is fixed at its base end on the lift frame 11 and has a stopper nut 75 screwed on its leading end, as also shown in FIG. 5. Sliding of the slide member 73 (FIG. 4) along the guide rail 74 causes the clutch-operating cylinder 49 to slide along the rod 47 while constantly maintaining a given orientation. Then, when a pressurized fluid is passed through a pressurized-fluid passage 51 within the rod 47, it is supplied into a pressurized-fluid chamber 49b defined between the piston 48 and the rear end wall of the cylinder 49 and this causes the clutch-operating cylinder 49 to be retracted, thereby bringing the clutch 44 into disengagement as shown by dashed lines in FIG. 4. When the pressurized fluid is passed through another pressurized-fluid passage 52 within the rod 47, it is supplied into another pressurized-fluid chamber 49a defined between the piston 48 and the front end wall of the cylinder 49, so that the clutch-operating cylinder 49 is advanced to bring the clutch 44 into engagement as shown by the solid line in FIG. 4.

The aforesaid clutch-operating cylinder 49 and clutch-operating claw 50 constitute a clutch-operating device C. In this embodiment, since the clutch-operating cylinder 49 slides on the stationary piston rod 47 mounted in projecting relation from the front face of the lift frame 11 and the clutch-operating claw 50 is mounted on the cylinder 49 at its base end, i.e., at its end close to the lift frame 11, it is possible to reduce the amount of overhang of these members and to mount the clutch 44 at a location extremely close to the lift frame 11. Especially, when the clutch 44 is in its disengaged position shown by the solid lines in FIG. 11, the driving engage member 44a can assume a position extremely close to the front face of the lift frame 11, leading to a contribution to the compaction of the tool-driving unit A.

A tapered surface 55t which expands forwardly is formed on the inner peripheral surface at the front end of the the hollow spindle 55, so that a tapered surface 57t formed on the outer peripheral surface of a tool holder 57 may be placed into close contact with the tapered surface 55t. With the tool holder 57 fitted over the tapered surface 55t, engagement of an engage pin 56 fixed on the front end face of the hollow spindle 55 with an engage recess defined in an outer peripheral surface at the front end of the tool holder 57 permits a rotational driving force from the hollow spindle 55 to be transmitted through the engage pin 56 to the tool holder 57.

A tool holder shaft 58 having an enlarged portion at its rear end projects rearwardly from a rear end face connected to the tapered surface 57t of the tool holder 57 and is adapted to be fitted into a cylindrical portion 60 formed at the front end of a draw bar 59 mounted to axially extend within a hollow portion of the hollow spindle 55 in the rear of the tapered surface 55t. A plurality of, for example, three ball holding holes are provided at circumferentially spaced distances in the cylindrical portion 60 to radially pass therethrough, and a ball 61 is held in each of the ball holding holes, so that it is prevented from being released. A cylindrical member 62 having a forwardly enlarged tapered surface 62t formed on an inner periphery at its front end is held in the hollow portions of the hollow spindle 55 at a location corresponding to the cylindrical portion 60. The draw bar 59 has a nut 63 threadedly connected to its rear end and is constantly subjected to a rearwardly acting drawing force under the influence of biasing forces of a number of annular leaf springs 64 interposed between the nut 63 and a shoulder on the inner periphery of the hollow spindle 55. This spring deflecting force causes each of the balls 61 to move along the tapered surface 62t on the inner peripheral surface of the cylindrical member 62 and then onto a decreased diameter portion thereof, thereby clamping the tool holder shaft 58 to ensure that the tool holder 57 is held within the section of the tapered surface 55t. A slice cutter 77 as a tool is integrally held at the outer end of the tool holder 57 which is in a working position.

To remove the tool holder 57 from the hollow spindle 55, the turret head 17 is rotated through about 180° to locate the spindle 16 in the tool-replacing position and then, the base end of the draw bar 59 is forwardly pushed against the spring deflecting forces by a push rod which will be described hereinafter, while a clasping claw in a tool-replacing position (not shown) is brought into engagement with the annular engage groove 65 provided on the outer periphery surface at the leading end of the tool holder 57, so that the tool holder 57 is withdrawn from the hollow spindle 55. In this manner, the tool holder 57 can be removed from the hollow spindle 55.

A pressurized air intake hole 59c is made in the draw bar 59 and axially passes therethrough into communication with the interior of the cylindrical portion 60. In removing the tool holder 57 from the hollow spindle 55 for replacing the tool, pressurized air can be introduced into the pressurized air intake hole 59c from the bar rear end and sprayed onto the tapered surface 55t to clean the latter.

Referring to FIGS. 4 to 7, the spindle head 16 is in the working position, and the splice cutter 77 serving as a tool held by the tool holder 57 is in a machining state. On the contrary, the spindle head 66 is in the tool-replacing position, i.e., in a waiting position. A hollow spindle 69 is rotatably supported on the inner periphery of the spindle head 66 through a bearing 67 and a group of bearings 68 and retains a tool holder 71 for holding a tool shaft 70.

The hollow spindle 69 has the same structure as the hollow spindle 55. A driven engage member 72 of the clutch 44 is fixedly mounted on the outer peripheral surface at the base end of the hollow spindle 69, and an engage groove 83 is provided in close vicinity to the driven engage member 72. On the other hand, a bracket 79 supports a hook 80 at its base end and is pivoted at a pivoting portion 78 of a bracket B which is fixedly mounted on the lift frame 11. A fork-like engage claw 82 is formed at a leading end of the hook 80 and is engageable in a groove 83 provided around the outer periphery of the hollow spindle 69 which is in a waiting position. In addition, a long hole 81 is provided in the central outer periphery of the hook 80 opposed to the clutch-operating cylinder 49 and is elongated from the base end portion of the hook 80 toward the leading end thereof. An engage pin 76 is mounted on the upper surface of the clutch-operating cylinder 49 to project therefrom and is loosely fitted in the long hole 81. Thus, while the clutch-operating cylinder 49 is retracted to bring the clutch 44 into diengagement for rotation of the turret head 17 about the axis 1 by the operating of the turret-rotating motor 21, the hook 80 is swung about the pivoting portion 78 toward the lift frame 11, so that the engage claw 82 is released from the engage groove 83. On the other hand, when one of the pair of spindle heads, for example, the spindle head 16 is located in the working position, while at the same time, the other spindle head 66 is located in the tool-replacing position and the clutch-operating cylinder 49 is advanced to bring the clutch 44 into engagement, the hook 80 is forwardly swung about the pivoting portion 78 due to the engagement of the long hole 81 thereof with the engage pin 76 on the cylinder 49, so that the engage claw 82 engeges the engage groove 83. This acts against a force axially applied to the hollow spindle 69 and prevents undue force from being applied to the bearing 67 and the group of bearings 68.

Figure 6:
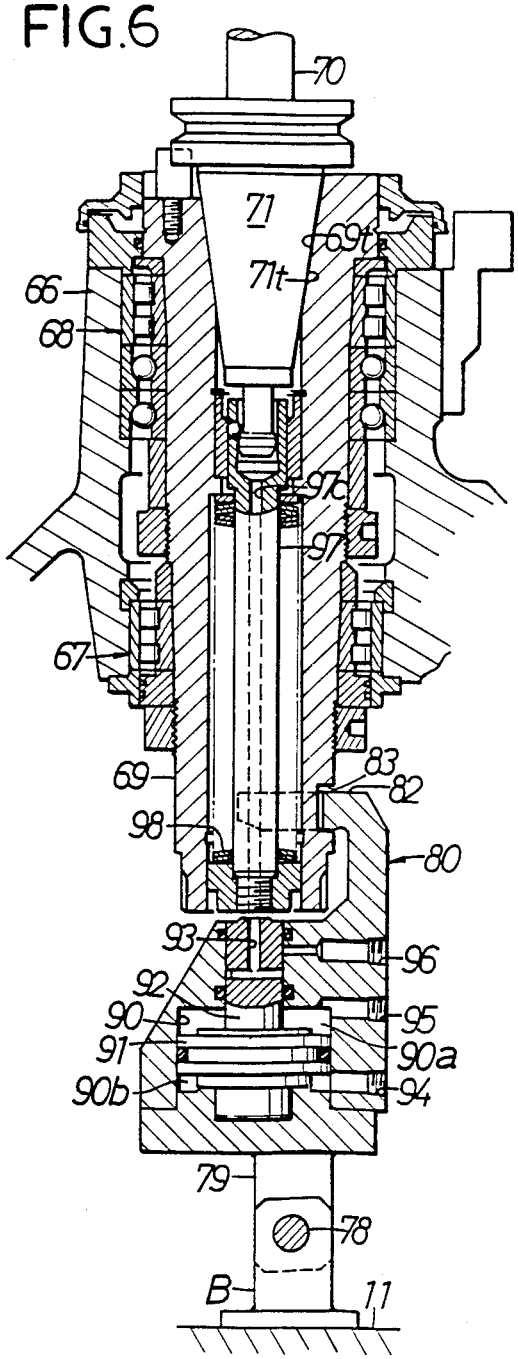
FIG. 6 is a sectional view shown in FIG. 4.
Figure 7:
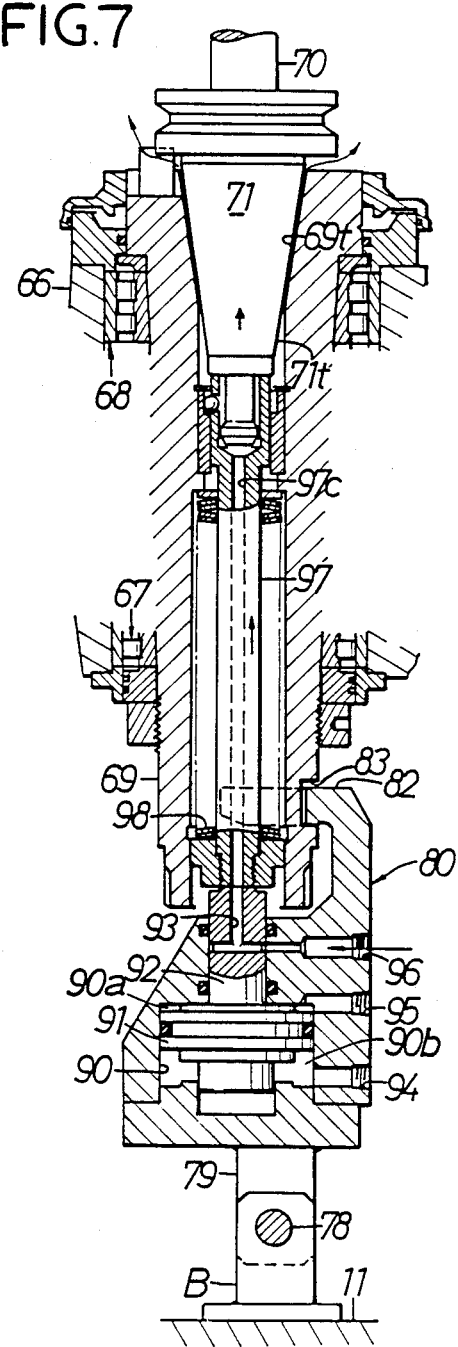
FIG. 7 is a sectional view similar to FIG. 6, but in an operative condition different from the condition in FIG. 6.

Particularly referring to FIGS. 6 and 7, a cylinder 90 is integrally defined in the hook 80, so that a leading end of a push rod 92 integral with a piston rod of a piston 91 slidable in the cylinder 90 can protrude toward the leading end of the hook 80, i.e., toward the rear end of the draw bar 97. A flow passage 93 is defined within the push rod 92 and opened to the leading end of the push rod 92. When a pressurized fluid is introduced from a pressure source (not shown) through a port 95 into a pressurized-fluid chamber 90a in front of the piston 91, as shown in FIG. 6, the piston 91 is retracted toward the base end of the hook 80 to block the flow passage from the port 96. On the other hand, with the engage claw 82 of the hook 80 engaging the engage groove 83 at the base end of the spindle 69, as shown in FIG. 7, when the pressurized fluid is introduced through the port 94, the pressure increases within the pressurized-fluid chamber 90b in the rear of the piston 91, the piston 91 is moved toward the leading end of the hook 80 and with this movement, the push rod 92 urges the base end of the draw bar 97 to move it toward the leading end of the stationary spindle 69 against the spring force of a leaf spring 98. At the same time, the flow passage 93 communicates with the port 96 and is also connected to a pressurized-air intake hole 97c within the draw bar 97, so that pressurized air is introduced through the port 96, the flow passage 93 and the pressurized-air intake hole 97c into an annular clearance between the tapered surface 69t at the leading end of the spindle 69 and the tapered surface 71t of the tool holder 71 to act on the tool holder 71 so as to push it upwardly away from the spindle 69.

As a result, the engagement of the draw bar 97 with the tool holder 71 is released, so that the tool holder 71 can be released from the spindle 69, while the tapered surface 69t of the spindle 69 is cleaned by the pressurized air. During this time, the hook 80 is in engagement with the base end of the spindle 69 and hence, the spindle 69 cannot be urged toward the leading end and undue force cannot be applied to the bearings 67 and 68.

As described above, unlike a push rod for releasing the engagement of a tool holder and a draw bar being mounted in a fixed position as in the conventional apparatus, the push rod 92 used in the present invention is mounted on the hook 80 pivoted on the lift frame 11 and can be moved along with the hook 80 to a retracted position close to the lift frame 11 during rotation of the turret head 17 to avoid interference with the base end of the spindle. Moreover, when releasing the tool holder located in the tool-replacing position from the spindle, the hook 80 engages the spindle 69 and concurrently the push rod moves to an operative position in the rear of the base end of the spindle and this makes it possible to achieve an extremely efficient and rapid tool-replacing operation. Additionally, it is possible to enhance the compact size and mechanical rigidity of the tool driving unit.

In addition, the swinging movement of the hook 80 between the operative and retracted positions is produced in response to the advancing and retracting movements of the clutch operating cylinder 49 of the clutch-operating device C. Specifically, in the present invention, the engagement and disengagement of the clutch 44 with and from the spindle 55 which is in the working position and the swinging movement of the push rod 92 between the operative position and retracted position in order to be associated with the other spindle 69 which is in the tool-replacing position can be simultaneously provided by the movement of the single cylinder 49. For this reason, it is unnecessary to provide special operating means for swinging the hook 80, thereby making it possible to avoid complication of the structure of the tool-driving unit A.

Figure 8:
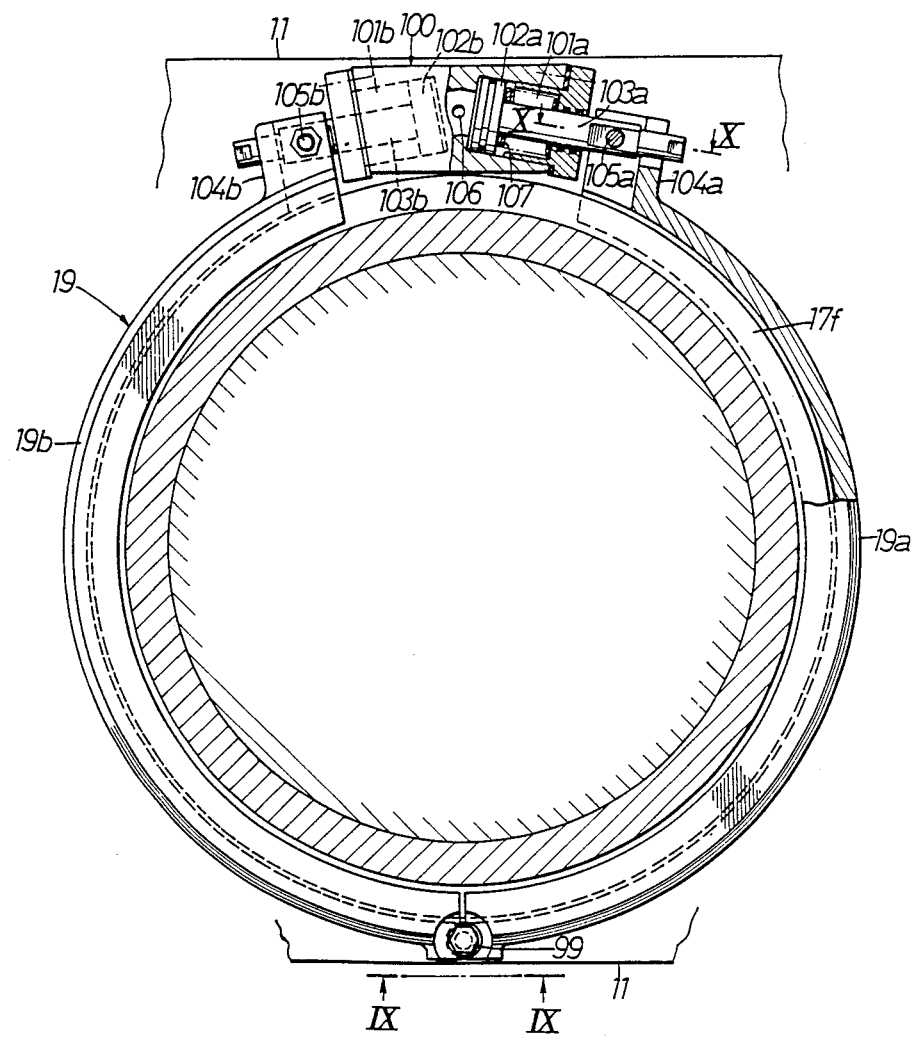
FIG. 8 is a sectional view taken along line VIII—VIII in FIG. 3.
Figure 9:
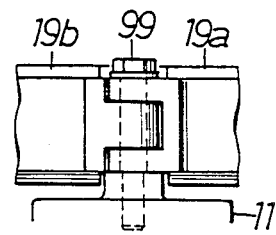
FIG. 9 is a side view taken along line IX—IX in FIG. 8.
Figure 10:
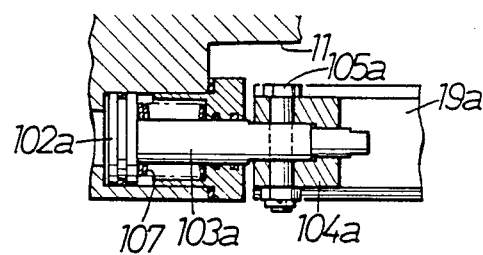
FIG. 10 is a sectional view taken along line X—X in FIG. 8.

Referring to FIGS. 8 to 10, an annular clamp assembly 19 comprises a pair of semi-circular clamp pieces 19a and 19b each having a base end pivoted at a pivoting portion 99 on the lift frame 11. A clamp-operating cylinder 100 is disposed at a location between respective leading ends of the clamp pieces 19a and 19b and supported by the lift frame 11. A pair of cylinder chambers 101a and 101b are defined in the clamp-operating cylinder 100 in an opposed relation, and pistons 102a and 102b are slidably received respectively in the cylinder chambers 101a and 101b and have respective piston rods 103a and 103b which are pivoted at corresponding pivoting portions 105a and 105b of brackets 104a and 104b formed at those opposed leading ends of the clamp pieces 19a and 19b which extend and face opposite each other. The opposed surfaces of the individual pistons 102a and 102b respectively define pressurized-fluid chambers communicating with a common port 106, and a leaf spring 107 is interposed between each of the pistons 102a and 102b and each of cylinder end walls penetrated by the piston rods 103a and 103b.

Therefore, the pistons 102a and 102b are each normally subjected to a spring deflecting force by the corresponding leaf spring 107 and biased toward each other. During working and during replacement of tool, no pressurized fluid is introduced through the port 106, and each of the pistons 102a and 102b receives a force in an approaching direction by the action of the spring deflecting force of the corresponding leaf spring 107, causing the inner peripheral surface of each of claim pieces 19a and 19b to bear against the corresponding tapered surface 11t, 17t of the outer peripheral flange 11f, 17f, as shown in FIGS. 3 and 4, thereby ensuring that the turret head 17 is fixed to the lift frame 11 by a wedge action.

Upon rotation of the turret head 17, introduction of the pressurized fluid through the port 106 causes the individual pistons 102a and 102b to move away from each other, and as a result, the individual clamp pieces 19a and 19b are swung outwardly about the pivoting portion 99 away from the outer peripheral flanges 11f and 17f, respectively, so that the turret head 17 can be rotated relative to the lift frame 11.

Such clamp assembly 19 operates to reliably fix the turret head 17 to the lift frame 11 during working, so that the generation of vibration of the turret head 17 can be prevented even during a high speed machining, thus enabling a high working accuracy.

Figure 12:
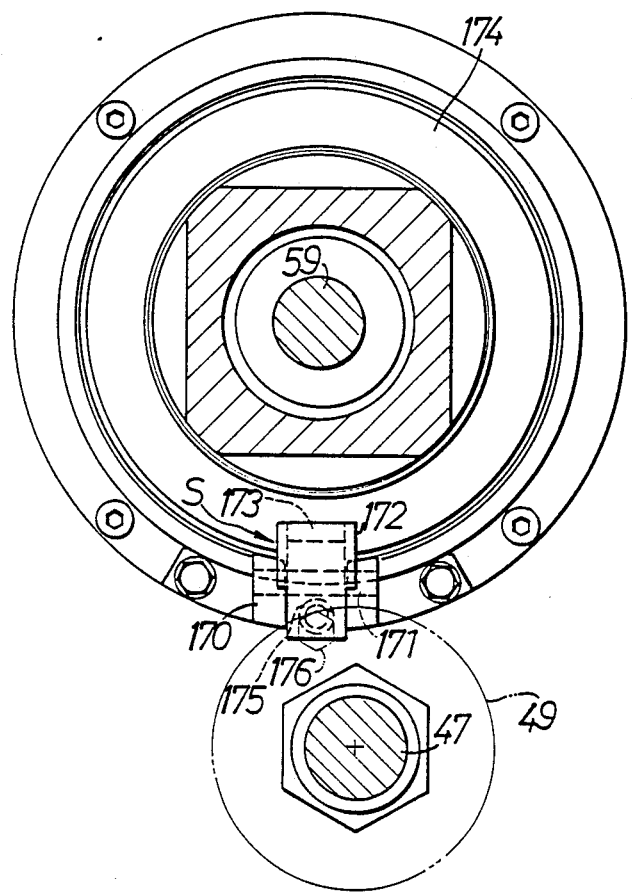
FIG. 12 is a sectional view taken along line XII—XII in FIG. 11.

A stopper assembly S is provided between the turret head 17 and the hollow spindle 55 for restricting the rotation of the spindle 55. As shown in FIGS. 11 and 12, the stopper assembly S comprises a stopper arm 172 pivotally mounted at 171 on a bracket 170 secured to the turret head 17, and a spring 175 for biasing the arm 172 in a counterclockwise direction as viewed in FIG. 11 in order to cause a stopper surface provided at a leading end of the arm 172 and having a friction material thereon to bear against a ring-like nut 174 integral with the spindle 55. A base end of the arm 172 is opposed to an urging piece 176 protruded from the front end wall of the clutch-operating cylinder 49. The urging piece 176 is adapted to engage the base end of the arm 172 for forced pivotal movement of the arm 172 in a clockwise direction about the pivoting portion 171 as indicated by the dashed lines in FIG. 11, when the clutch operating cylinder 49 has reached a limit of advance or forward movement to bring the clutch into engagement.

Description will now be made of the operation of this embodiment. In FIGS. 1 to 3, the spindle 55 is in the working position. During this time, the clutch-operating cylinder 49 is located at the limit of forward movement to maintain the clutch 44 in the engaged state, so that an output torque from the tool-rotating motor 29 is transmitted through the gears 34, 38 and 42, the gear shaft 41 and the clutch 44 to the spindle 55 to rotate the slice cutter 77. It should be noted that in this state, the urging piece 176 at the front end of the clutch-operating cylinder 49 causes the base end of the stopper arm 172 to be forcedly swung in the clockwise direction away from the ring-like nut 174 against the biasing force of the spring 175, as shown in dashed lines in FIG. 11 and therefore, the spindle 55 cannot receive a braking force at all from the stopper arm 172.

On the other hand, as shown by the solid lines in FIG. 4, the engage claw 82 of the hook 80 is in engagement with the engage groove 83 in the spindle 69 which is in the tool-replacing position, and if the pressurized fluid is introduced into the rear pressurized-fluid chamber 90b in the cylinder 90 under this condition, the push rod 92 pushes the base end of the draw bar 97 forwardly as shown in FIG. 7, thus enabling the replacement of the tool.

Upon completion of machining by the slice cutter 77, the spindle 55 is accurately positioned in a rotation-stopped position relative to the turret head 17 by stopping the rotation of the tool-rotating motor 29. Thereafter, if the clutch-operating cylinder 49 is retracted, the clutch 44 is switched into its disengaged state as shown by the solid lines in FIG. 11, while at the same time releasing the stopper arm 172 by the urging piece 176, so that the stopper surface at the leading end of the arm 172 is caused to bear against the ring-like nut 174 of the spindle 55 by the action of the biasing force of the spring 175. Thus, the spindle 55 is frictionally connected to the turret head 17 through the arm 172 for restriction of the rotation thereof. At this point, the hook 80 is swung rearwardly to assume the waiting position shown by the dashed lines in FIG. 4.

Then, the turret rotating motor 21 is started to rotate the turret head 17 through 180°, thereby moving the spindle 55 from the aforesaid working position to the tool-replacing position. During this time, there is developed a difference in inertia forces respectively acting on closer and remoter portions of the large diameter slice cutter 77 with respect to the rotational axis 1 of the turret head, and a couple of acts on the spindle 55 about its longitudinal axis due to this difference. As described above, however, the rotation of the spindle 55 is reliably restricted by a stop action of the stopper arm 172 and hence, there is no possibility to miss the rotation-stopped position of the spindle 55 located in the aforesaid working position. In addition, the base ends of the spindles 55, 69 cannot interfere with the push rod 92 which has been retracted rearwardly.

When the spindle 55 has reached the tool-replacing position, a positioning member of a tool-replacing device (not shown) is brought into engagement with an engage portion (not shown) of the spindle 55, thereby completing the alignment of the tool-replacing device with the spindle 55, followed by transfer of tools therebetween.

Figure 13:
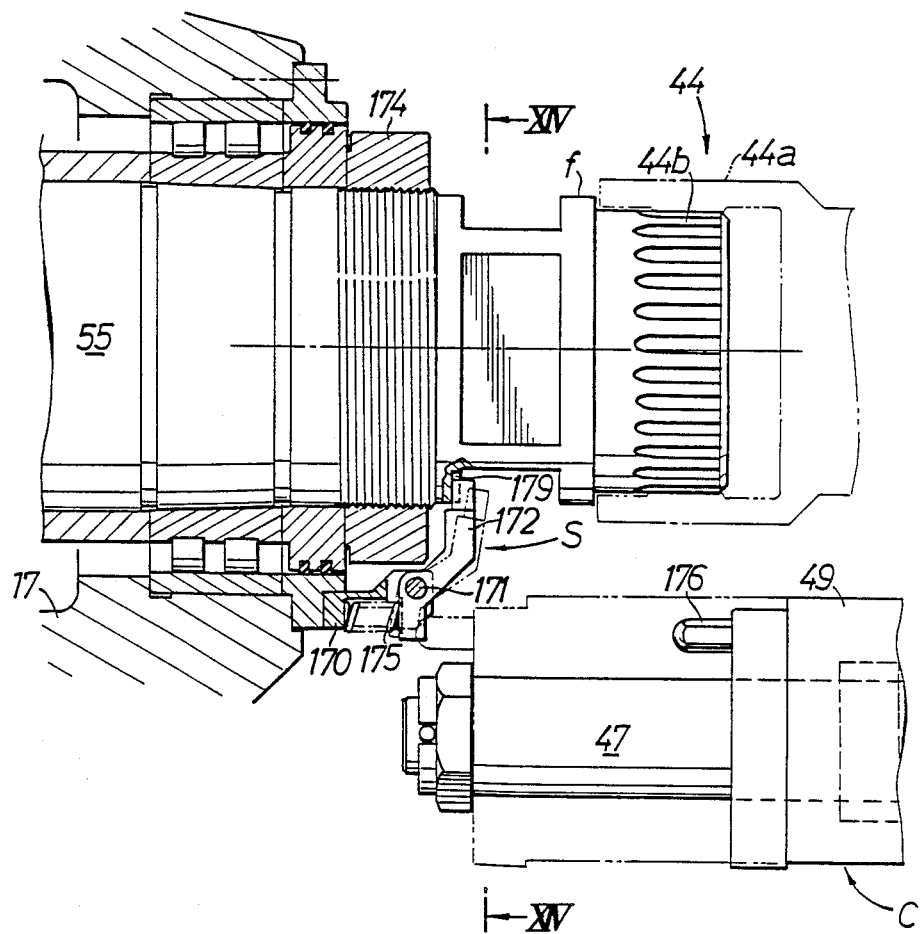
FIGS. 13 and 14 illustrate a modification of a stopper assembly for a spindle, FIG. 13 being a view similar to FIG. 11, and FIG. 14 being a sectional view taken along line XIV—XIV in FIG. 13.
Figure 14:
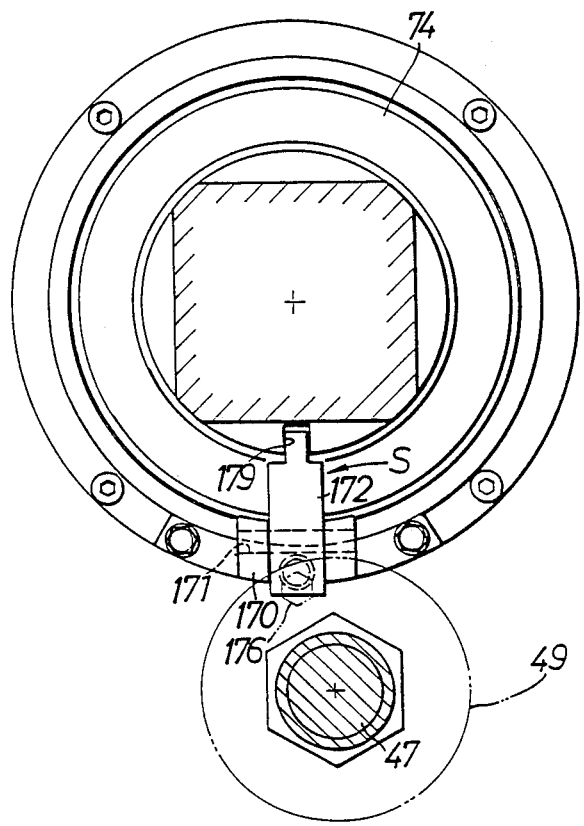
Figure 15:
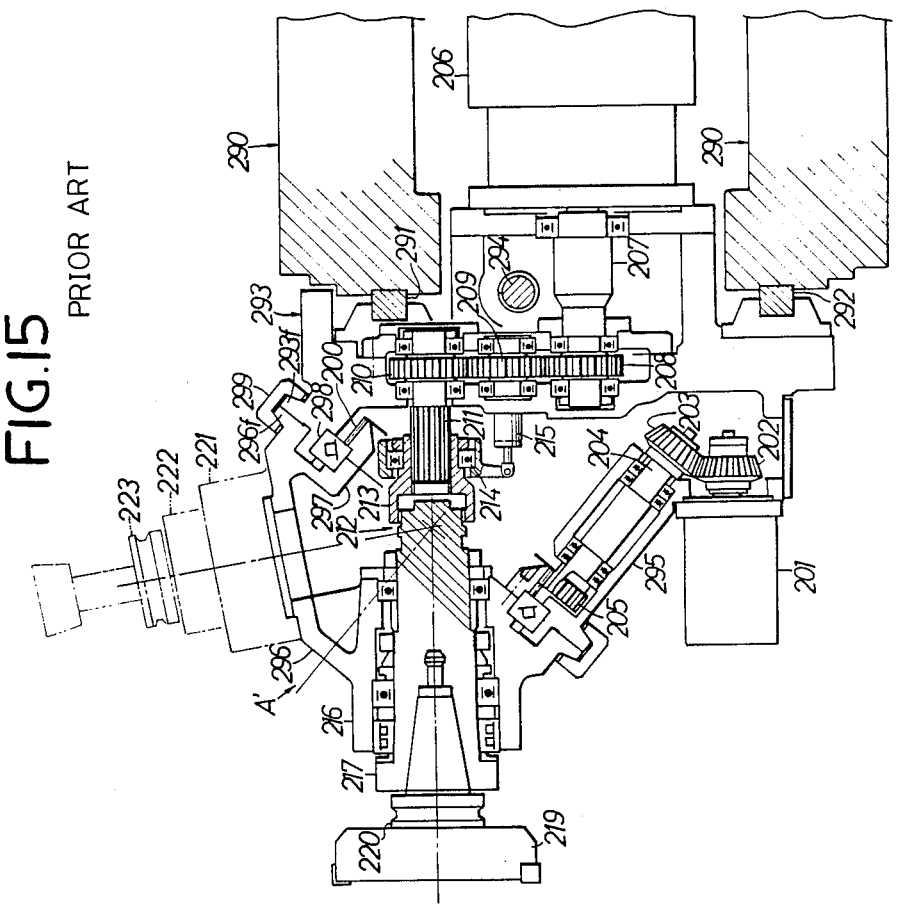
FIG. 15 illustrates a known machine tool.

A modification of the stopper assembly S is shown in FIGS. 13 and 14. In this modification, the leading end of the stopper arm 172 is adapted to be brought into mechanical engagement with a positioning groove 179 formed in an outer peripheral stepped portion of the spindle 55, and this engagement enables the spindle 55 to be reliably restricted in rotation without provision of the friction member 173 at the leading end of the stopper arm 172 as in the previous embodiment.

What is claimed is:

1. A machine tool comprising a column, a tool-driving unit movable upwardly and downwardly relative to said column, and a pair of guide rails mounted on a front surface of said column to extend vertically thereon and horizontally spaced from each other for guiding upward and downward movements of said tool-driving unit, said tool-driving unit including a lift frame slidable on said guide rails and a tilting-type turret head supported on a front surface of said lift frame and rotatable about an axis inclined with respect to a fore and aft direction of the frame in a horizontal plane, wherein one of the pair of guide rails is relatively disposed forwardly of the other guide rail, so that the individual guide rails both assume positions close to the turret head.

2. A machine tool according to claim 1 wherein said guide rails are substantially equally spaced from said axis of rotation of said turret head.

3. A machine tool according to claim 1, wherein said turret head has a plurality of spindles rotatably supported thereon, said spindles being arranged to successively assume a working position through rotation of said turret head about said axis, so that one spindle located in the working position can receive a rotational driving force transmitted from a drive source through a clutch, said clutch including a driving engage member close to said lift frame and a driver engage member on said spindle and engageable with said driving engage member; and wherein said machine tool includes control means supported on said lift frame for controlling the engagement and disengagement between the driving and driven engage members of said clutch.

4. A machine tool according to claim 3, wherein said control means includes a rod projecting from the frame parallel to a rotational axis of the spindle located in said working position and having a stationary piston mounted on an intermediate portion of the spindle, said control means further including a clutch operating cylinder slidably fitted over said rod, and a clutch operating claw projecting from the end of said cylinder which is close to the lift frame and engaging said driving engage member.

5. A machine tool according to claim 1, wherein said turret head has a plurality of spindles rotatably supported thereon, said spindles being arranged so that when any one of them is located in a working position by rotation of said turret head about said axis, at least one of the other spindles assumes a tool-placing position, the machine tool further including a clutch for controlling transmission of a rotational driving force from a drive source to the spindle located in said working position; a push rod for urging a base end of a draw bar axially passing through a hollow portion of the spindle located in said tool-replacing position to release a tool holder from said spindle, said push rod being movable between an operative position in which the push rod is aligned with the base end of the draw bar with the spindle located in said tool-replacing position and a retracted position spaced from said base end; and a clutch-operating cylinder for controlling the engagement and disengagement of said clutch, said clutch operating cylinder being operatively coupled to said push rod for moving the push rod between said operative and retracted positions as said clutch is engaged and disengaged.

6. A machine tool according to claim 1, wherein said turret head has a plurality of spindles rotatably supported thereon, said spindles being arranged so that when any one of them is located in a working position by rotation of said turret head about said axis, at least one of the other spindles assumes a tool-replacing position, said machine tool further including a hook pivotably mounted to said frame and swingable between an engaged position in which it engages a base end of the spindle located in said tool-replacing position and a retracted position spaced from the base end of the spindle located in said tool-replacing position, a clutch which connects the spindle located in the working position to a drive source, means coupling said clutch and said hook to move said hook between said engaged and retracted positions in accordance with the operation of said clutch; and a displaceable push rod operated by a cylinder integral with said hook to displace a draw bar axially passing through a hollow portion of the spindle located in said tool-replacing position when said hook is in said engaged position, thereby releasing a tool holder held at a leading end of said draw bar from the spindle located in said tool-replacing position.

7. A machine tool according to claim 6, wherein said clutch comprises a driven engage member at a base end of the spindle located in said working position and a driving engage member movable along the rotational axis of said spindle for engagement with and disengagement from said driven engage member, the machine tool further including a clutch-operating cylinder slidable over a stationary rod projecting from said lift frame for moving said driving engage member between an engaged position and a disengaged position, said clutch-operating cylinder and said hook being connected together by a long hole provided in one thereof engaged with an engage pin mounted on the other so that said hook swings between its engaged and retracted positions in response to sliding movement of said clutch-operating cylinder over said stationary rod.

8. A machine tool according to claim 1, wherein said turret head has a plurality of spindles mounted thereon; an outer peripheral flange formed on an outer periphery at an end edge of a cylindrical support of said frame and a second outer peripheral flange formed on an outer periphery at an end edge of a cylindrical connection of said turret head, said flanges being opposed to each other over the rotational axis of said turret head, said individual outer peripheral flanges having tapered back surfaces to cooperatively form an annular wedge; a pair of semi-circular clamp pieces pivoted on said frame to engage the corresponding tapered surfaces of said individual outer peripheral flanges; and a clamp-operating cylinder supported between respective leading ends of said pair of clamp pieces for providing a swinging operation of the leading end of each of said clamp pieces in a plane parallel to said outer peripheral flanges.

9. A machine tool according to claim 1, wherein at least two tool rotating spindles are on said turret head for displacement relative to said frame by rotation of said turret head between a working position and a tool-replacing position; a clutch is interposed in a power transmitting means between a motor on the lift frame to one spindle in said working position and is operatively connected with a clutch-operating device capable of engaging and disengaging the clutch; and stoppers are provided between said turret head and said spindles for restricting rotation of the spindles, and means for releasing the stopper for the spindle located in said working position from its stopping operation in response to the operation of said clutch operating device when said clutch comes into the engaged state.

* * * * *